United States Patent [19]

Mori

[11] 4,135,889

[45] Jan. 23, 1979

[54] SINGLE STAGE, COAL GASIFICATION REACTOR

[75] Inventor: Shuji Mori, Lexington, Ky.

[73] Assignee: University of Utah, Salt Lake City, Utah

[21] Appl. No.: 752,348

[22] Filed: Dec. 20, 1976

[51] Int. Cl.$^2$ ............................ C10J 3/48; B01J 8/18

[52] U.S. Cl. ..................................... 48/73; 48/197 R;
48/206; 34/57 A; 201/31; 422/143; 422/147

[58] Field of Search ................. 23/288.5, 284; 201/31; 34/10, 57 A; 48/73, 99, 197 R, 202, 206, 210

[56] References Cited

U.S. PATENT DOCUMENTS

| | | | |
|---|---|---|---|
| 2,527,197 | 10/1950 | Rollman | 48/206 |
| 2,885,272 | 5/1959 | Kimberlin, Jr. et al. | 23/284 |
| 2,895,811 | 7/1959 | Schaaf | 23/288.5 |
| 3,063,932 | 11/1962 | Osborne | 23/288.5 X |
| 3,074,777 | 1/1963 | Cortes | 23/288.5 X |
| 3,092,468 | 6/1963 | Slyngstad et al. | 23/288.5 X |
| 3,236,607 | 2/1966 | Porter, Jr. et al. | 23/284 |
| 3,495,952 | 2/1970 | Ulbrecht et al. | 23/284 X |
| 3,661,799 | 5/1972 | Cartmell | 23/288.5 X |
| 3,733,186 | 5/1973 | Zemaitis, Jr. | 48/206 X |
| 3,957,459 | 5/1976 | Mitchell et al. | 201/31 X |
| 4,035,152 | 7/1977 | Yang et al. | 23/284 |

Primary Examiner—Morris O. Wolk
Assistant Examiner—Roger F. Phillips
Attorney, Agent, or Firm—Criddle, Thorpe & Western

[57] ABSTRACT

A fluid bed reaction apparatus for providing separate reaction sites for segregated reactions in processes such as coal gasification, wherein the respective gasification and subsequent combustion reactions are separated within a single stage reactor. The fluid bed reactor comprises a shell or housing for containing a shell side fluid bed and one or more vertical standing tubes located within the shell side which form the segregated tube reaction sides. The open lower ends of the standing tubes are displaced a short distance above a distributor plate which operates as the base of the shell side fluid bed column. A Venturi nozzle coaxially oriented below the standing tube mouth provides a high velocity fluid flow into the tube side of the reactor. Carbonaceous particles are first reacted as they travel down the shell side reaction chamber. With the gasification reaction essentially completed as the reactant particles reach the distributor plate, the dynamic forces created by the Venturi nozzle draw the reacted material into the tube side where the segregated combustion reaction occurs. The reaction products of the respective shell and tube sides can therefore be separately extracted or recycled as desired.

17 Claims, 3 Drawing Figures

SINGLE STAGE, COAL GASIFICATION REACTOR

BACKGROUND

1. Field of the Invention

This invention relates to coal gasification fluid beds used in combination with stand pipes or tubes which operate substantially to isolate the fluid of the fluid bed side from that of the tube side, wherein particles are transferred from the fluid bed to the tube side by means of an ejector nozzle utilizing the Venturi Principle.

2. Description of the Prior Art

The technology relating to the agitation of a column of particulate solids by means of introducing gases or other fluids to develop a fluid bed zone is a well developed art. The dynamic conditions required to establish a fluidized state of particulate matter are well defined in current literature and need not be further developed herein.

Generally, the particulate matter is retained in a tank or shell with the column of particles being partially supported by a base or a distributor plate. Customarily, the distributor plate contains a plurality inlets or ducts through which the gas or other fluid is forced to activate a fluidized state. The random motion of the particles caused by the circulating fluid permits rapid heat transfer and difusion of reactant gases throughout the fluid bed.

Because of the improved heat transfer and difusion of reactants, fluid bed systems are particularly useful as reaction sites in systems where the primary interaction occurs between particles and a fluid phase reactant, such as coal gasification for production of fuel gases.

With the increased interest in coal gasification, numerous fluid bed systems have been developed for reacting coal particles with steam. A typical reaction sequence for this process is as follows:

(1) $C + H_2O_{(steam)} \rightarrow H_2 + CO$ (2) $C + O_{2\ (heat)} \rightarrow CO_2 + heat$ (3) $CO + H_2O \rightarrow H_2 + CO_2$ (4) $3H_2 + CO \rightarrow CH_{4(gas)} + H_2O$ Reactions (1) and (2) customarily occur in a single chamber, with reaction (2) furnishings the heat for reaction (1). The final reaction is (4) which yields the desired methane gas ($CH_4$). Because of the requirement for a 3:1 ratio of $H_2$ to $CO$ in reaction (4) an additional source of $H_2$ is required. Reaction (3), sometimes referred to as the water-shift reaction, provides the additional $H_2$ to reach the necessary stoichiometric concentrations of $H_2$ and $CO$.

The water-shift reaction is required when air or $O_2$ is fed into the coal reaction zone with the steam, since reactions (1) and (2) produce relatively large amounts of $CO$ and $CO_2$ with a corresponding lesser volume of $H_2$. When air is used for the combustion reaction (2), the additional constituent of $N_2$ further reduces the relative percent of usable raw gas. A preferred system would isolate reactions (1), (3) and (4) from (2) such that the $H_2$ produced in (1) would further react with the $CO$ concurrently produced, leading to an isolated reaction sequence as follows:

(1) $2C + 2H_2O\ (steam) \rightarrow 2H_2 + 2CO$ (3) $2CO + 2H_2O\ (steam) \rightarrow 2H_2 + 2CO_2$ (4) $3H_2 + CO \rightarrow CH_4 + H_2O$ Because isolation has not heretofore been achieved on an economical basis, however, the fuel gas from current coal gasification processes requires additional steps in reaching the primary $CH_4$ product, and yields a combination of gases including $CO_2$ and $N_2$, possessing a lower BTU rating per volume of gas.

In addition to problems arising from combining the combustion reaction with the steam reaction, current reaction systems require means for withdrawing ash and other unconsumed miner by-products from the reaction shell, disposing of such materials as waste. Since this disposal process usually requires mechanical power without adding new energy, the net energy produced by the system is further decreased. A preferred system would involve minimum consumption of carbonaceous materials and minimal power requirements for disposal of remaining by-products, as well as minimal amount of thermal loss by any other means.

These specific illustrations are merely representative of a broad field of art that would generically be described as fluid bed reaction systems where separate reaction zones may be utilized to improve overall efficiency in yielding the desired product. Such systems will frequently involve requirements for heat transfer from a first reaction site to a second reaction site and would have to have communication therebetween which is compatable with the existence of a fluid bed in at least one of the sites.

OBJECT AND SUMMARY OF THE INVENTION

It is an object of the present invention to provide a fluid bed reaction system having two or more reaction sites which operate to separate concurrent reactions which if reacted together in the same chamber would produce a less desirable product.

It is a further object to provide such a system wherein heat is transferred from a first reaction site to a second reaction site, while maintaining a substantial separation of reactions.

It is an additional object to provide a system for coal gasification which separates the combustion reaction from the steam reaction, thereby eliminating unwanted nonfuel gases from the final product.

A still further objective of this invention is to provide a Venturi valve means to operate in a fluid bed system for transferring particulate matter from a first reaction site to a second site.

These objectives and others are accomplished in the subject fluid bed, particle transferring apparatus. This multiple column system comprises an outer shell or housing for containing a shell side fluid bed reaction zone. Also contained therein are one or more vertical standing tubes which function to segregate the tube side reaction from the shell side. The standing tubes are open at the lower end and are displaced from a distributor plate which operates as the fluid bed actuating base member. A Venturi nozzle is located coaxially below each open standing tube and operates to conduct the fluid bed particles from the shell side to the tube side. The respective shell and tube reaction products can be easily segregated or recycled as desired. The efficiency of many reaction processes can be improved by use of such a system because of improved heat transfer between the segregated reactions and more effective particle reactant movement between the respective reaction sites.

DETAILED DESCRIPTION OF THE INVENTION

Figure 1:
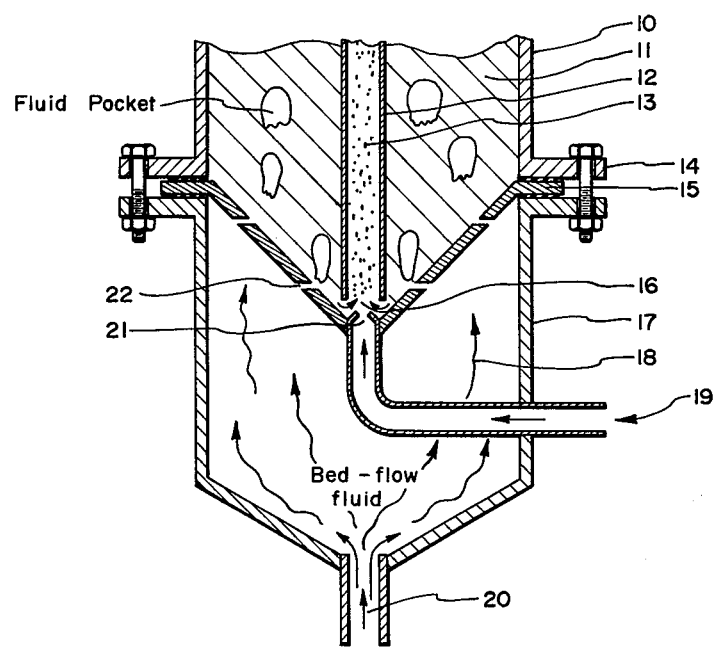
FIG. 1 is a vertical cross-sectional view of a multiple column, fluid bed apparatus of generic design.
Figure 2:
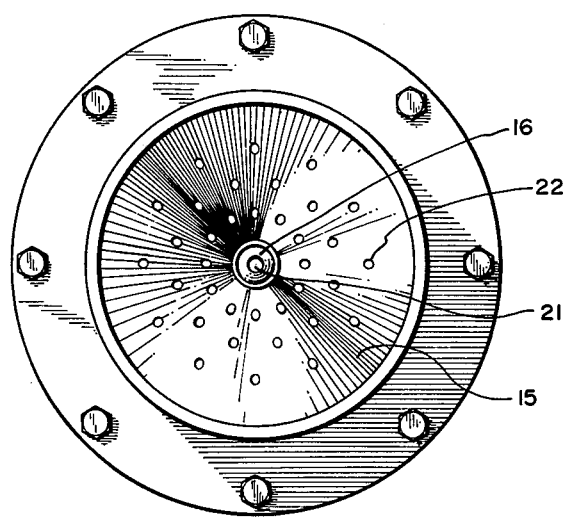
FIG. 2 is an elevational, cross-sectional view along the axis of the apparatus, cutaway at a horizontal plane intersecting above the distributor plate.

A single stage, fluid bed reactor as described in FIGS. 1 and 2 is composed of (a) a shell 10, (b) a distributor plate 15 for actuating a fluid bed zone of particulate matter within the shell, (c) one or more standing tubes 12 situated within the shell and oriented directly over (d) one or more separate Venturi nozzles 21 which operate together to draw the particulate matter from the fluid bed zone 11 into the standing tubes, and (e) collection means for recycling or separating the products and constituents of the processes.

The shell 10 functions as the main housing for the overall system and varies in construction with the nature of the process or reaction conducted therein. Where the reactions involve high temperatures and pressures, the shell should provide sufficient strength and insulation or, in the alternative, heat transfer capability to ensure the safety and efficiency of the operation. The method of operation of the subject apparatus requires at least two segregated reaction or process zones, numbered 11 and 13.

The standing tubes 12 contained within the shell provide the separation walls to segregate these zones. That volume circumscribed by a standing tube is customarily identified as the tube side of the apparatus 13. The remaining volume within the shell which is not part of the tube side is designated the shell side of the apparatus 11. The shell side will usually contain the conventional fluid bed of particulate matter, which is introduced by conventional feed means. The tube side operates with a more dilute phase fluid bed, enabling rapid transport and suction of particles therein.

This separation of tube side from shell side enables the coordination of two incompatible reactions or processes within the same system of operation. An exothermic reaction, for example, can be conducted in the tube side, with a concurrent heat transfer through the tube wall to the shell side, thereby energizing the latter reaction site. Such benefits are particularly unique to sequential or recycling reactions or processes such as coal gasification and catalytic cracking of petroleum.

The fluid bed state is developed in the shell side by means of a distribution plate 15 and fluid source 20. This technology is substantially well developed, but will be briefly outlined for clarity. The distributor plate operates as the supporting base for the fluid bed column 11. As illustrated, the plate is conical in form, with perforations or inlets 22 horizontally displaced to minimize particle loss which would occur with vertical holes when the particulate matter is static. A nonperforated distributor may also be used where the fluid is introduced by other means.

A fluid bed is established when high velocity fluids are passed through the distributor plate, thereby setting in motion the particulate matter within the shell side. The conical form avoids aggregation of material between the holes along the distributor plate and assists in feeding particles to the standing tube opening 16 above the Venturi nozzle 21. Particle size, fluid velocity and chemical and physical properties of the particles must be evaluated and controlled to ensure an operable fluid bed state. In addition, the height of the fluid bed column must be suitably determined and the depth of the conical distributor plate coordinated therewith. Customarily, the cone depth is no more than one-fifth of the total bed height for stable fluidization. The exact methods of determining the relative values of these various factors are well established and need not be detailed herein.

One or more standing tubes 12 are appropriately situated within the shell perimeter so as to have the tube opening 16 coaxially oriented within the cone of the distributor plate. The displacement of the tube opening from the distributor plate is dependent upon the rate of particle transfer desired. A greater displacement would naturally increase the transfer rate of particles into the tube side, until the capacity of the Venturi nozzle is surpassed.

Materials used in tube construction would be selected to conform to heat transfer requirements between the shell and tube sides of the system. For example, in applications where the shell side reaction requires an outside heat source, the tube is constructed of material having high heat exchange capacity. An exothermic reaction is conducted in the tube side and thereby furnishes the necessary energy to activate the shell side reaction.

The dimensions of the tube will depend on the height of the shell side fluid bed, the nature of the reaction or process contained therein, the design of the Venturi nozzle interface with the tube opening and the type fluid used as the carrying medium within the tube side. The ratio of cross sectional area of the tube to that of the fluid bed also has a direct effect on the rate of transfer of the solid particles from the shell side to the tube side, as do the shape and vertical displacement of the tube. Additional elements may be required to implement the specific reactions or processes, such as an ignition system to start a combustion reaction within the tube side. All these factors can be determined by conventional techniques and need not be detailed further.

Generally, the tube side will have a more dilute phase fluid than the conventional fluid bed of the shell side. This is particularly true where the nature of the reaction or process conducted in the tube side requires only a short residence time, as is usually the case in a combustion type reaction. This dilute phase is facilitated by the Venturi nozzle transfer means in that a higher velocity fluid is fed directly into the tube opening as compared with the lower velocity in the shell side, thereby setting up the dynamic forces which are required for particle transfer under the Venturi Principle.

The fluid utilized with the Venturi nozzle will, in most cases, differ from that used in the shell side of the apparatus. This follows from the primary benefit of having segregated reaction/process zones and using the same solid particulate matter in both. In most cases the differing reactions are the consequence of utilization of differing reaction fluids. To distinguish these fluids, the respective references used herein shall be "tube fluid" and "shell fluid." It should be understood that this reference relates to the fluid location, and not merely to composition. Therefore, in some cases, the same fluid may be applied to both sides concurrently.

When the separation of differing fluids is essential to the proper operation of the apparatus, the pressure difference between the outside and inside of the Venturi nozzle must be nearly equalized so that little or no fluid flow is generated across the boundary of the tube and shell reaction zones. The particle transfer occurs similar to a hopper type system with the tube fluid operating as the transferring force. The constant aggitation of the particles within the distributor cone maintains the flow of particulate matter into the tube fluid path.

The respective shell and tube fluids are normally fed separately to the respective sides of the apparatus. FIG. 1 illustrates the use of a feed chamber 18 for the shell fluid delivery. This system is conventional for fluid beds and provides uniform flow through the various holes 22 of the distributor 15. The feed chamber is supplied by means of an inlet 20. FIG. 1 illustrates the segregated tube fluid source 19 which leads directly to the Venturi nozzle and is contained in the feed chamber. This configuration of apparatus forms a column-like structure with walls 10 and 17 joined by flange 14, the combination defining the outside column and the tube(s) forming the inside column structure. Hence, the apparatus is described as a multiple column fluid bed, as opposed to a single column type.

The structures for collection of products from the reaction or process zones are coordinated with the objectives of the system. If the purpose of such operations is to provide a product unique to only one of the two reaction zones, then a separate collection system would be applied to maintain segregated products. In such cases the two sides may be unconnected except for the transfer region at the Venturi nozzle. In many cases the tube side will discharge a flue gas to be eliminated from the system. In other applications the particulate matter of the tube side will be recycled to the shell side through a cyclone separator, with flue gas being exhausted away from the apparatus. These variations will become more apparent with the following discussion of two primary applications of the multiple column, particle transferring fluid bed apparatus.

Application of the subject apparatus to coal gasification results in two segregated reaction zones on the respective tube and shell sides of the apparatus. The shell side reaction occurs between coal particles and the fluidizing steam. A combustion reaction in the tube side consumes the remaining coal char.

Figure 3:
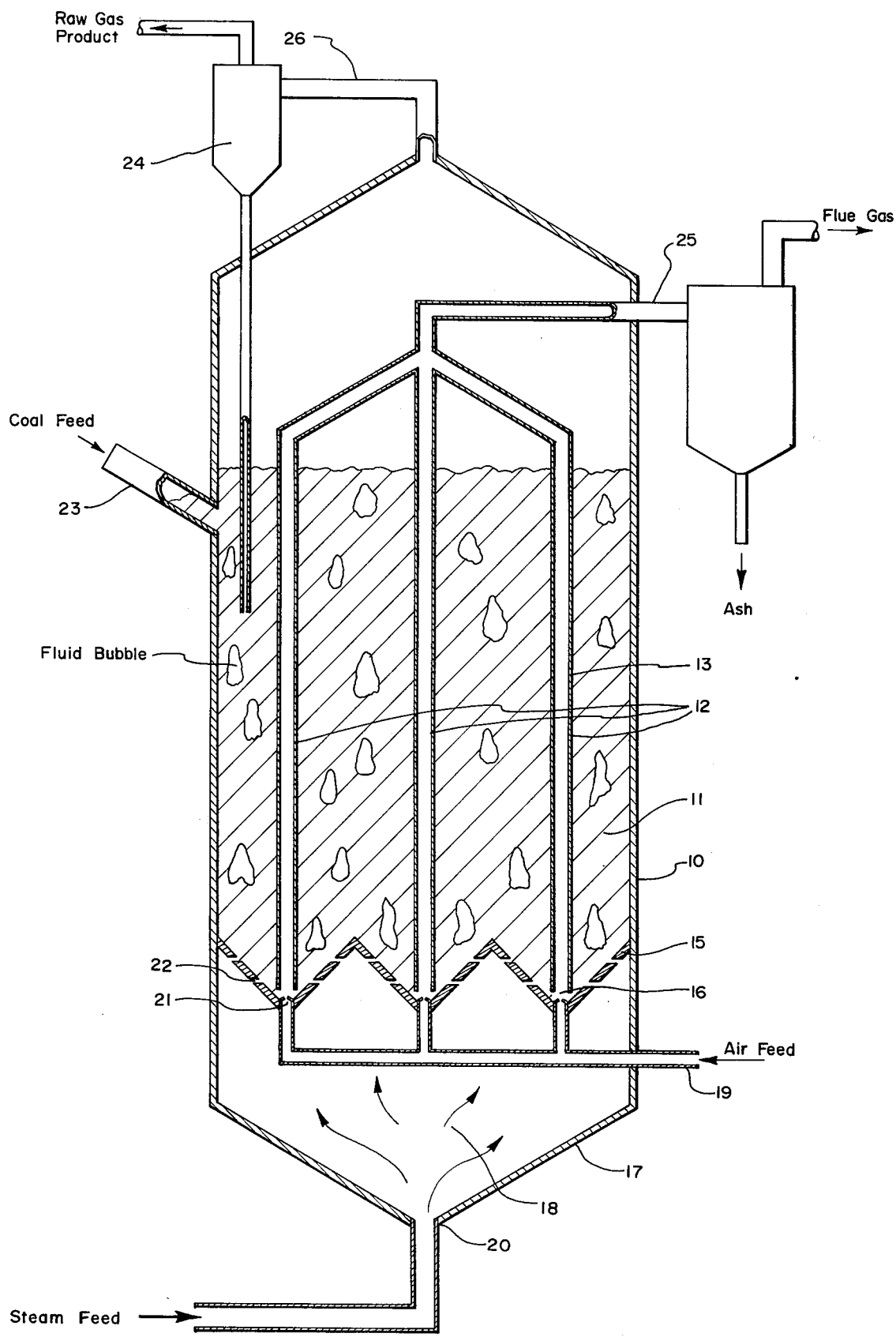
FIG. 3 depicts a cutaway, cross sectional view of a coal hydrogasification species of the generic apparatus, having a plurality of tube side reaction sites.

Referring to FIG. 3, minus 60 mesh coal powder is fed into the upper part of the shell side 23. High pressure steam is introduced from inlet 20 through chamber 18 and distributor perforations 22 into the shell side of the apparatus. An effective reaction rate of the fluidized coal and steam will occur at 1000°–2400° F. and 300–1500 psig, with the char by-product of the reaction emerging at the distributor plate. It is important to maintain the shell side temperature below about 2400° F., since slag formation may begin to occur above this temperature and will cause agglomeration of the coal particles. The present invention will best function in the temperature range for dry-ash as disclosed in H.H. Lowry, "Chemistry of Coal Utilization", Supplemental Vol., Wiley & Son, New York (1963) p.828.

The char by-product of the shell side reaction is transferred to the tube side 16 by means of the high velocity air passing from the Venturi nozzle 21. The combustion reaction between the char and oxygen in the tube side furnishes heat through the tube wall 12 to the shell side. In most cases, substantially all of the char will be consumed during passage up the stand tube. The gaseous by-products of the combustion reaction are exhausted as flue gas. Any ash may be separated from the flue gas by means of a cyclone unit.

By maintaining separate product collection means, the flue gas produced by the combustion reaction is segregated from the fuel gas. Fuel gas is removed by suitable means 26 and coal dust or other extraneous particulate matter is returned to the fluid bed by a cyclone unit 24. As a consequence of the segregated reaction of coal with steam, the fuel gas has a higher $H_2$ and $CH_4$ content and no nonreactive $CO_2$ and $N_2$ constituent, even though air is used in the combustion reaction.

A number of additional benefits arise by application of the multiple column, particle-transferring fluid bed apparatus to the gasification of coal. The system permits a preferred sequence of treatment of the coal, first reacting the coal with steam for the primary product, then combusting the resultant less reactive char to produce heat to drive the first reaction. This provides the maximum energy conversion from a given mass of coal feed material and reduces waste of spent char. The use of heat transfer tubing ensures good conduction of thermal energy from the tube to the shell side. Slag formation or unreacted coke is minimized due to the fact that heavy char is fed to the combustion zone at the Venturi nozzle, where the carbonacious material is consumed.

The overall effectiveness of the system is further improved because the hydrogen generated by the coal-steam reaction is not consumed by oxygen. This consequence of separating the air-combustion reaction from the coal-steam reaction permits the shell side hydrogen concentration to increase to facilitate methane production. This reaction environment is illustrated by the following reaction sequence:

$$C + H_2O \rightarrow H_2 + CO$$

$$CO + H_2O \rightarrow H_2 + CO_2$$

$$3H_2 + CO \rightarrow CH_4 + H_2O$$

It is apparent that if these reactions are attempted in an air/oxygen atmosphere, the oxygen would react with the $H_2$ to form $H_2O$, thereby impeding the primary methane producing reaction. This also avoids the requirement for the water shift reaction discussed earlier which heretofore has involved an additional step to the conventional coal gasification system.

Although preferred forms of the invention have been herein described, it is to be understood that the present disclosure is by way of example and that variations are possible without departing from the scope of the hereinafter claimed subject matter, which subject matter is to be regarded as the invention.

I claim:

1. A single stage, fluidbed coal gasification reactor comprising:
   a. a closed shell side having enclosing wall structure for containing a fluid bed of particulate carbonaceous material;
   b. a tube side comprising the volume within an enclosing tube which is positioned within said shell side in substantial upright orientation, said tube side being substantially segregated from said shell side except for an opening at the lower end of said tube which permits transfer of said carbonaceous material from the shell side to the tube side during operation of the reactor;

c. means for introducing shell side reactant fluid at the base of said shell side to actuate a fluid bed state of the particulate carbonaceous material therein;

d. means for introducing a high flow of oxygen containing fluid into said lower tube opening, e. means adapted for actuating a combustion reaction between said contained oxygen and said carbonaceous material within said tube side, and f. means for separately removing gaseous products from the respective shell and tube sides of the reactor.

2. A reactor as defined in claim 1, wherein said enclosing tube is constructed of material having high heat transmissive characteristics for conducting thermal energy between the tube side and the shell side.

3. A reactor as defined in claim 1, further comprising additional tube members in upright orientation within the shell side to provide additional tube side reaction sites, each tube member having a means for introducing a high flow of oxygen containing fluid into lower openings thereof.

4. A reactor as defined in claim 1, wherein said means for separately removing gaseous products includes a tube coupled to said tube side and extending through said enclosing wall structure of the shell side to conduct by-products of the combustion reaction out of said shell side.

5. A reactor as defined in claim 1, further comprising a cyclone separating means coupled to said tube side for separating and returning carbonaceous material from combustion reaction by-products and returning said material to the shell side for further reaction.

6. A reactor as defined in claim 1, further comprising a distributor plate positioned toward the base of said shell side and in close proximity below said tube opening.

7. A reactor as defined in claim 6 wherein said distributor plate comprises a conical structure whose apex extends downward and in co-axial orientation with respect to said tube with said tube opening being proximate to the interior surface of said conical structure.

8. A reactor as defined in claim 7, wherein said distributor plate further comprises horizontally traversing inlets disposed around the surface of said conical structure for passing said shell side reactant fluid to the shell side, thereby adapting the structure for fluid bed operation.

9. A reactor as defined in claim 1, wherein said means for introducing a high flow of oxygen containing fluid includes a nozzle spatially displaced from said tube opening at a distance based upon the desired rate of particle transfer from the shell side to the tube side, said nozzle being adapted to direct substantially all fluid passing therefrom into said tube opening.

10. A reactor as defined in claim 1, wherein said means for introducing the oxygen containing fluid is adapted to draw air with oxygen therein for use as a combustion reactant.

11. A reactor as defined in claim 7, wherein said shell side reactant fluid is introduced into a feed chamber located below the distributor plate and structured to withstand high internal pressures, said feed chamber providing uniform fluid flow through said distributor plate.

12. A reactor as defined in claim 11, wherein the shell side is in stacked configuration over the feed chamber and separated by a distributor plate mounted therebetween, with said conical apex protruding into the feed chamber.

13. A reactor as defined in claim 1, wherein said means for introducing the shell side reactant fluid is adapted for coupling to a source of steam as the shell side reactant fluid.

14. A reactor as defined in claim 1, wherein said means for actuating a combustion reaction comprises an ignition system located at the opening of said tube.

15. A reactor as defined in claim 1, wherein the length of said tube and enclosing shell side is sufficiently long to permit substantially complete combustion of entrained carbonaceous material injected at said tube opening.

16. A reactor as defined in claim 1, wherein said means for separately removing gaseous products from the shell side comprises an outlet located toward the top of said shell side with external tube means communicating therewith for removing raw gas produced by the steam-carbon reaction of the shell side.

17. A reactor as defined in claim 16, further comprising a cyclone separator means coupled to said tube means for removing raw gas and operable to return partially reacted carbonaceous material to the shell side for further reaction.

* * * * *